United States Patent [19]

Yoshimitsu

[11] Patent Number: 4,706,616
[45] Date of Patent: Nov. 17, 1987

[54] INTERNAL COMBUSTION ENGINE CYLINDER LINER COATINGS

[75] Inventor: Toshio Yoshimitsu, Oyama, Japan

[73] Assignee: Kabushiki Kaisha Komatsu Seisakusho, Tokyo, Japan

[21] Appl. No.: 877,651

[22] Filed: Jun. 23, 1986

[51] Int. Cl.⁴ .............................................. F02F 1/16
[52] U.S. Cl. ................... 123/41.84; 123/193 C; 123/668
[58] Field of Search .......... 123/41.84, 193 C, 193 CP, 123/193 CH, 668, 669

[56] References Cited

U.S. PATENT DOCUMENTS

| | | | |
|---|---|---|---|
| 1,820,878 | 8/1931 | Wyckoff | 123/668 |
| 2,914,048 | 11/1959 | Philipp | 123/668 |
| 3,620,137 | 11/1971 | Prasse | 123/193 C |
| 4,344,390 | 8/1982 | Heydrich et al. | 123/193 CH |
| 4,398,527 | 8/1983 | Rynbrandt | 123/668 |
| 4,495,907 | 1/1985 | Kamo | 123/193 C |
| 4,530,340 | 7/1985 | Totman | 123/669 |

Primary Examiner—William A. Cuchlinski, Jr.
Attorney, Agent, or Firm—Armstrong, Nikaido, Marmelstein & Kubovcik

[57] ABSTRACT

A cylinder liner mounted within an internal combustion engine cylinder block has a coating of a wear and seizure resistant material such as a ceramic applied to the inside surface of its upper portion. The inside surface of the cylinder liner lower portion, which is subject to lower temperatures than is the upper portion, has a coating of a commercially available surface treatment composition composed principally of manganous phosphote. The use of this surface treatment composition makes the inside surface treatment of the cylinder liners significantly less expensive without adversely affecting the engine performance than if the complete inside surface is coated with the wear and seizure resistant material.

3 Claims, 2 Drawing Figures

CYLINDER LINER LENGTH

INTERNAL COMBUSTION ENGINE CYLINDER LINER COATINGS

BACKGROUND OF THE INVENTION

This invention relates generally to internal combustion engines, and more specifically to the cylinder liners mounted in the engine cylinder block. Still more specifically, the invention concerns the coatings applied to the inside surfaces of the cylinder liners for making them resistant to wear and seizure.

Some internal combustion engines have cylinder blocks made of aluminum with a view to lightness and heat conductivity. However, aluminum is too soft to use as cylinder wall material. It would wear very rapidly. A well known solution to this problem is the use of cast iron cylinder liners. These are, in fact, sleeves that are either integrally cast into the cylinder block or installed later. The cylinder liners generate much heat as they make direct sliding contact with the pistons, so that they must be cooled by water or air. However, as is well known, as much as one third of the total heat generated by the combustion of the fuel has usually been wasted by the forced cooling of the engine. The reduction of this cooling loss will result not only in a decrease in energy loss but also in the smaller space requirement of the cooling system.

A dissipation of less heat from the cylinder liners necessitates the protection of their inside surfaces against overheating. Various coating materials have been suggested which are believed to be capable of making the cylinder liner surfaces resistant to seizure and abrasion. Such suggested materials include chromium carbide, titanium carbonate and oxide, chromium oxide, and alumina titania. However, the coating of these materials on the complete inside surfaces of the cylinder liners adds considerably to the manufacturing costs of the engines. For this reason some of them have won only a limited acceptance, and others none at all, among engine manufactures.

SUMMARY OF THE INVENTION

The present invention provides a solution to the problem of how to protect the inside surfaces of engine cylinder liners against seizure and wear with a minimal increase in the manufacturing costs of the engines.

According to the invention, stated in brief, a prescribed upper portion of the inside surface of a cylinder liner is coated with a material that is particularly wear and seizure resistant at high temperatures. The remaining portion of the cylinder liner inside surface is coated with a surface processing agent composed principally of manganous phosphate.

The term "upper portion" is used herein and in the claims appended hereto in reference to the normal upstanding attitude of the internal combustion engine, with the cylinder head or heads at the top and with the oil pan at the bottom. Thus the upper portion of the cylinder liner is the part that defines the combustion chamber in combination with the cylinder head and pistonhead and so is subject to higher temperatures during engine operation than the remaining lower portion of the cylinder liner. Only the inside surface of this upper portion is therefore coated with a material that is wear and seizure resistant at high temperatures. The other inside surface portion of the cylinder liner is coated with the surface processing preparation which is available commercially. The coating of the upper and lower inside surface portions with the different materials makes the cylinder liner less expensive than if, as has been the case heretofore, its complete inside surface is coated with a wear and seizure resistant material.

The above and other features and advantages of this invention and the manner of realizing them will become more apparent, and the invention itself will best be understood, from a study for the following description and appended claims, with reference had to the attached drawings illustrating a preferable embodiment of the invention.

DESCRIPTION OF THE PREFERRED EMBODIMENT

Figure 1:
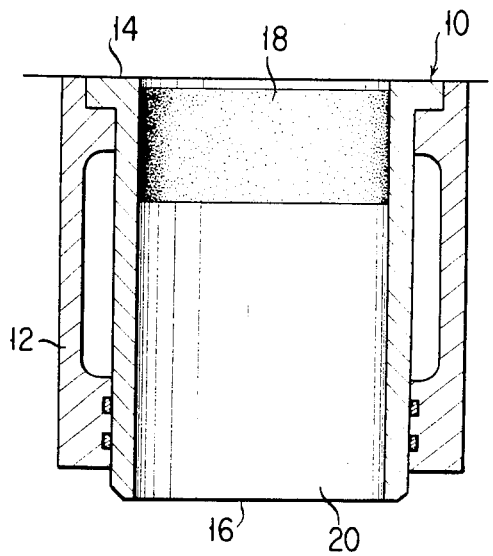
FIG. 1 is an axial section through a preferred form of the cylinder liner constructed in accordance with the invention, the cylinder liner being shown together with part of the cylinder block in which it is mounted.

The invention will now be described more specifically in terms of the air cooled cylinder liner 10 shown in FIG. 1. The cylinder liner 10, which can be of conventional cast iron, is mounted in a cylinder block 12 of aluminum or like lightweight metal. FIG. 1 depicts the cylinder liner 10 in the usual upstanding attitude. Thus, the top end 14 of the cylinder liner is to be joined to the cylinder head, and its bottom end 16 is directed toward the crankcase or oil pan, although the cylinder head and oil pan are both not shown because they constitute no essential part of this invention.

It is, of course, the upper part of the cylinder liner 10 that defines the combustion chamber in combination with the cylinder head and pistonhead (not shown). In accordance with the invention, the inside surface of an upper portion of the cylinder liner 10 bears a coating 18 of ceramic or like material that is particularly resistant to friction, abrasion and seizure in a high temperature range to which that upper portion is to be subjected during engine operation. By the "upper portion" of the cylinder liner 10 is meant the portion not exceeding one half of the axial dimension of the cylinder liner.

The inside surface of the remaining lower portion of the cylinder liner 10 has a coating 20 of "Parco-Lubrite", which is a trademark for a metal surface processing preparation manufactured by Nippon Parkerizng K.K., of Japan, and composed principally of manganous phosphate.

The following procedure is recommended for forming the coatings 18 and 20 on the inside surface of the cylinder liner 10. The ceramic or like material may first be coated by any known or suitable method on the inside surface of the prescribed upper portion of the cylinder liner 10. Then the entire inside surface including the its portion bearing the coating 18 may be machined to a required degree of smoothness. Then the complete cylinder liner 10 may be dipped in the bath of Parco-Lubrite, thereby forming its film 20 on the exposed lower inside surface portion of the cylinder liner. As desired, the coating 18 may be masked during the immersion of the cylinder liner in the Parco-Lubrite bath. However, the bath temperature can be so low (normally not more than 150° C.) that the bath will give no adverse effect on the coating 18 if it is left exposed.

Figure 2:
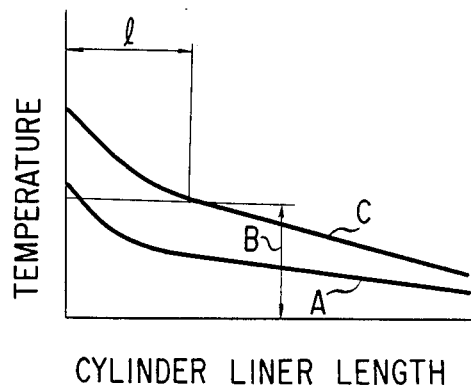
FIG. 2 is a graph showing temperature distributions in the axial direction of cylinder liners in accordance with the prior art and the present invention.

The curve A in the graph of FIG. 2 represents the temperature distribution along the length of a conventional water cooled cylinder liner during engine operation. The capital B indicates a temperature range in which the engine can operate safely. The safe temperature range is that not exceeding the maximum temperature reached by the conventional cylinder liner.

The curve C in the same graph represents the temperature distribution along the length of the cylinder liner 10 according to the invention. It is understood that the cylinder liner 10, as well as the associated cylinder head, is air cooled for less heat dissipation. Consequently, the temperatures of the cylinder liner 10 are generally higher than those of the prior art. The temperatures of its upper portion 1 in particular exceed the safe range B. The inside surface of this overheated upper portion 1 is therefore protected by the coating 18. The lower portion of the cylinder liner 10 has temperatures within the safe range B, so that the coating of the inside surface of this lower portion with the surface treatment agent suffices for all practical purposes.

Various modifications of the illustrated embodiment may be resorted to without departing from the scope of the present invention.

What is claimed is:

1. In an internal combustion engine having a cylinder liner mounted in a cylinder block, the improvement comprising a a first coating of a wear and seizure resistant material applied to the inside surface of a prescribed upper portion of the cylinder liner, and a second coating of a surface treating agent composed principally of manganous phosphate applied to the remaining inside surface of the cylinder liner, the first coating being more wear and seizure resistant than the second coating at higher temperatures to which the upper portion of the cylinder liner is subjected during engine operation than is the other portion.

2. The internal combustion engine of claim 1 wherein the prescribed upper portion of the cylinder liner is not more than one half of the total axial dimension of the cylinder liner.

3. The internal combustion engine of claim 1 wherein the wear and seizure resistant material is a ceramic.

* * * * *